G. LECUYER.
ANIMAL FORCEPS.
APPLICATION FILED OCT. 15, 1912.

1,077,086.

Patented Oct. 28, 1913.

Inventor
George Lecuyer

Witnesses
C. E. Kimpez
R. M. Smith

By Victor J. Evans
Attorney

UNITED STATES PATENT OFFICE.

GEORGE LECUYER, OF BARTLESVILLE, OKLAHOMA.

ANIMAL-FORCEPS.

1,077,086.   Specification of Letters Patent.   Patented Oct. 28, 1913.

Application filed October 15, 1912.  Serial No. 725,886.

*To all whom it may concern:*

Be it known that I, GEORGE LECUYER, a citizen of the United States, residing at Bartlesville, in the county of Washington and State of Oklahoma, have invented new and useful Improvements in Animal-Forceps, of which the following is a specification.

This invention relates to animal forceps, the object in view being to provide an implement of the class described, embodying jaws and handles so constructed and combined as to enable a firm hold to be taken either upon the snout or leg of the animal.

With the above and other objects in view, the invention consists in the construction, combination and arrangement of parts, as will be hereinafter more fully described, illustrated in the accompanying drawings, and pointed out in the claim hereunto appended.

Figure 1:
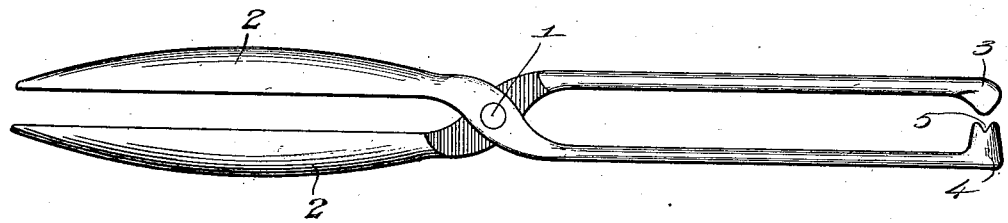
Figure 2:
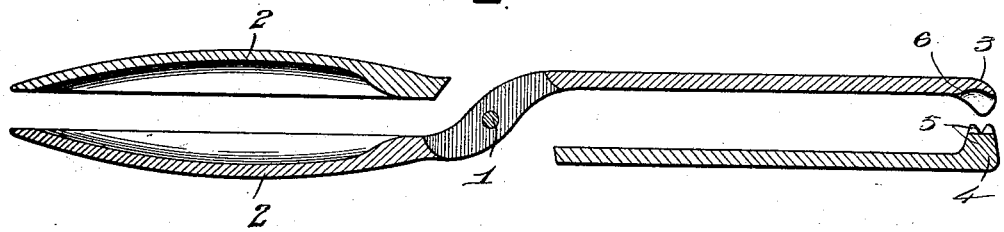
Figure 3:
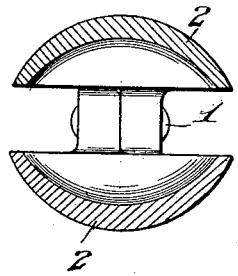
Figure 4:
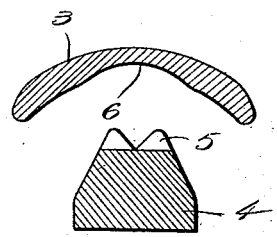
Figure 5:
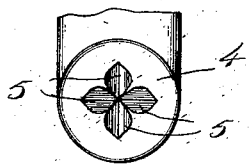

In the drawings: Figure 1 is a side elevation of a pair of animal forceps, embodying the present invention. Fig. 2 is a longitudinal section through the same. Fig. 3 is a cross section through the spoon-shaped handles. Fig. 4 is a cross section through the knob-like jaw. Fig. 5 is a plan view of the knob-like jaw.

The forceps contemplated in this invention comprise two members which cross each other at a point intermediate their ends, and are pivotally connected together, as shown at 1. At one side of the pivotal connection of the two members, they are provided with long slender spoon-shaped handles 2, having their concaved sides disposed toward each other. At the opposite side of the pivotal connection of the two members, one of the jaws 3 is curved or arcuate in shape transversely to the length of the members. The opposing jaw 4 is knob-like in formation, and has the end thereof rounded, as shown, and provided with intersecting notches or grooves 5, the object of which is to enable said jaw to obtain a firm hold on the lower jaw bone of the animal. It will also be noted that the jaw 3 is provided in the concaved face thereof with a notch or recess 6 corresponding approximately in shape to the rounded extremity of the knob-like jaw. While the knob-like jaw is adapted to fit into and engage the lower jaw bone, the curved jaw is designed to engage the lower jaw bone from the outside of the lower jaw bone, and this enables a firm grip to be taken on the snout of the animal. When used on the animal's leg, the central depression 6 is designed to receive the leg which is held therein tightly by the pressure of the notched knob-like jaw.

What is claimed is:

Animal forceps, comprising two snout engaging jaws, one of which is curved to partially embrace the exterior of the snout, the other snout jaw being knob-like in shape and adapted to engage the jaw bone within the snout, the knob-like jaw being formed with intersecting notches, and the curved jaw being formed with a leg holding recess in the concave face opposite the knob-like jaw.

In testimony whereof I affix my signature in the presence of two witnesses.

GEORGE LECUYER.

Witnesses:
PAUL CARTER,
A. M. CROOKE.

Copies of this patent may be obtained for five cents each, by addressing the "Commissioner of Patents, Washington, D. C."